No. 807,110. PATENTED DEC. 12, 1905.
S. D. COX.
AXLE AND BOX FOR VEHICLES.
APPLICATION FILED FEB. 17, 1905.

Witnesses
James F. Duhamel
Henry Watson

Inventor
Samuel D. Cox
By his Attorney
Chafin & Ferguson

UNITED STATES PATENT OFFICE.

SAMUEL D. COX, OF BALTIMORE, MARYLAND.

AXLE AND BOX FOR VEHICLES.

No. 807,110.   Specification of Letters Patent.   Patented Dec. 12, 1905.

Application filed February 17, 1905. Serial No. 246,038.

*To all whom it may concern:*

Be it known that I, SAMUEL D. COX, a citizen of the United States, residing at Baltimore, in the State of Maryland, have invented a new and useful Axle and Box for Vehicles, of which the following is a specification.

This invention relates to an improved axle and box for vehicles.

The object of the invention is to provide vehicles with axles and boxes of such a construction as will permit of the wheels of the vehicle being readily attached to or detached from the axle without the use of tools.

Other features of my invention will be fully set forth in the following specification and pointed out in the claims.

Figure 1:
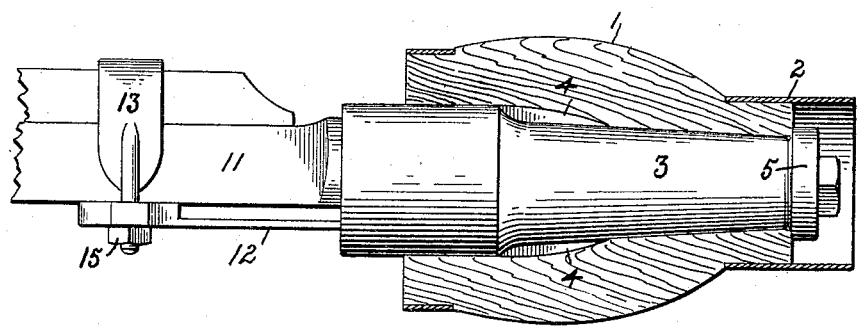
Figure 2:
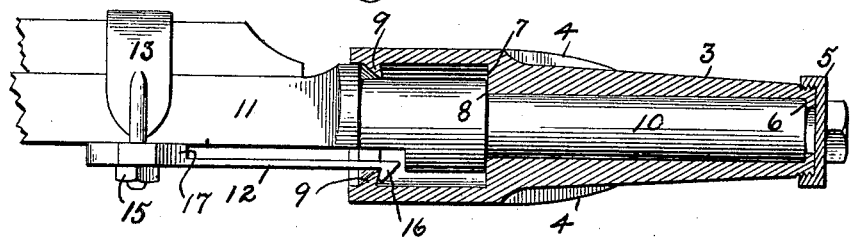
Figure 3:
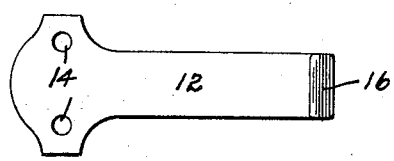

In the accompanying drawings, Figure 1 is a side elevation of my improved axle and box, the hub being shown in section. Fig. 2 is a vertical sectional view of the box, showing the axle secured therein. Fig. 3 is a bottom plan view of the locking-spring.

Similar reference-numerals designate like parts throughout the several views of the drawings.

Referring to the accompanying drawings, forming part of this specification, 1 designates the hub of the wheel, having the usual sand-shield 2 on the outer end thereof. The box 3 is fitted within the hub 1 in the usual manner and provided with two or more fins 4 to prevent the said box from turning in the hub. The outer end of the box 3 is provided with nut 5 to close the said end. The said box may, however, be cast with the outer end closed, if desired. Within the box 3, near the outer end thereof, is an annular shoulder 6, which prevents the oil or grease from working out of the end of the box. The box 3 is also provided with an annular shoulder 7, against which the shoulder 8 of the axle impinges. Near the inner end of the box is an annular flange 9, the outer surface of which inclines toward the center of the box. The spindle 10 of the axle 11 projects into the box 3, with the shoulder 8 impinging against the shoulder 7 of the said box.

A locking-spring 12 is provided with a tapering head 16 at one end and a lug 17 at the other end. The said spring is held to the axle by means of the clip 13 and bolts 15. By providing the spring 12 with the lug 17 on its upper surface, which rests against the axle, the head of said spring has sufficient room to work up and down between the axle and box when it is being inserted into or removed from the box, and when the axle is secured to the box the said spring maintains a true horizontal position parallel with the axle and prevents any tendency of the spring to pull out caused by the lateral strain of the wheel. The said spring 12 projects into the box 3 and is provided with a tapering head 16, which takes over the flange 9 of the box and locks the axle securely to the wheel of the vehicle. The abutting surfaces of the flange 9 and head 16 are slightly inclined to afford a more perfect locking-surface.

The inner end of the box 3 projects over the axle and locking-spring sufficiently to act as a sand-shield at that end.

To remove the wheel from the axle, it is only necessary to place a jack under the spring 12 and raise the axle slightly, whereby the weight of the vehicle will cause the outer end of the spring 12 to be forced up against the axle 11 and the head 16 released from the the flange 9, whereupon the wheel can be removed from the axle.

The wheel is secured to the axle by sliding the box 3 over the spindle 10, and as it is forced back the head 16 of the spring 12 rides up the inclined surface of the flange 9 until the said head springs over the said flange and the wheel is securely locked upon the axle.

Having thus described my invention, what I claim is—

1. The combination with the box having an annular flange on its inner surface, of an axle, a spring secured to said axle projecting into the said box and adapted to take over the said flange and lock the axle within the box, said spring having a lug on its upper surface impinging against the axle, whereby when the axle is locked within the box the said spring will assume a true horizontal position parallel with the axle.

2. The combination with the box having an internal annular shoulder near its outer end, an annular flange near its inner end, of an axle, a spring secured to the said axle and having one end projecting into the said box and adapted to take over the said flange and lock the axle within the box, and the opposite end provided with a lug on its upper surface whereby when the axle is locked to the box the said spring will assume a true horizontal position parallel with the axle.

3. The combination with the box having an internal annular shoulder near its outer end, an internal annular shoulder near the center thereof, and an annular flange near the inner end, of an axle having a shoulder at the rear of the spindle, and a locking-spring secured to the axle and having a tapering head on one end projecting into the box and adapted to take over the said annular flange and lock the axle within the box, and a lug at the other end on the upper surface thereof, whereby when the axle is locked to the box the said spring will assume a true horizontal position parallel with the axle.

In testimony whereof I have signed my name to this specification in the presence of two subscribing witnesses.

SAMUEL D. COX.

Witnesses:
 CHAPIN A. FERGUSON,
 HENRY WATSON.